United States Patent
Sun et al.

(10) Patent No.: US 9,169,766 B2
(45) Date of Patent: Oct. 27, 2015

(54) SYSTEM TO MONITOR REGENERATION FREQUENCY OF PARTICULATE FILTER

(71) Applicant: GM Global Technology Operations LLC, Detroit, MI (US)

(72) Inventors: Min Sun, Troy, MI (US); Michelangelo Ardanese, Royal Oak, MI (US); Raffaello Ardanese, Turin (IT); Vincent J. Tylutki, Livonia, MI (US); Giuseppe Schiavone, Bitonto (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/217,765

(22) Filed: Mar. 18, 2014

(65) Prior Publication Data

US 2015/0267590 A1 Sep. 24, 2015

(51) Int. Cl.
*F01N 3/00* (2006.01)
*F01N 11/00* (2006.01)

(52) U.S. Cl.
CPC .................................. *F01N 11/002* (2013.01)

(58) Field of Classification Search
USPC ............ 60/274, 286, 295, 297, 301, 303, 311
See application file for complete search history.

(56) References Cited

U.S. PATENT DOCUMENTS

| | | | |
|---|---|---|---|
| 8,051,645 B2 * | 11/2011 | Chamarthi et al. | 60/295 |
| 8,069,658 B2 * | 12/2011 | He et al. | 60/295 |
| 8,413,429 B2 * | 4/2013 | Gioannini et al. | 60/295 |
| 8,577,541 B2 * | 11/2013 | Nevin et al. | 701/29.4 |
| 8,776,502 B2 * | 7/2014 | Hiemstra et al. | 60/295 |

* cited by examiner

*Primary Examiner* — Binh Q Tran
(74) *Attorney, Agent, or Firm* — Cantor Colburn LLP

(57) ABSTRACT

An exhaust treatment system to treat exhaust gas includes a particulate filter configured to trap soot contained in the exhaust gas, and a pressure sensor that outputs a pressure signal indicative of a pressure differential of the particulate filter. A soot mass module is configured to determine a soot mass indicative of an amount of soot stored in the particulate filter based on the pressure differential. The soot mass is selectively determined according to a first soot model or a second soot model. An adaptation soot load module corrects the first soot model based on the second soot model such that the first soot model is adapted to the second soot model. A frequency regeneration module determines an actual rate at which the first soot model is corrected. The frequency regeneration module further determines the particulate filter is excessively regenerated based on the actual rate and a threshold.

15 Claims, 3 Drawing Sheets

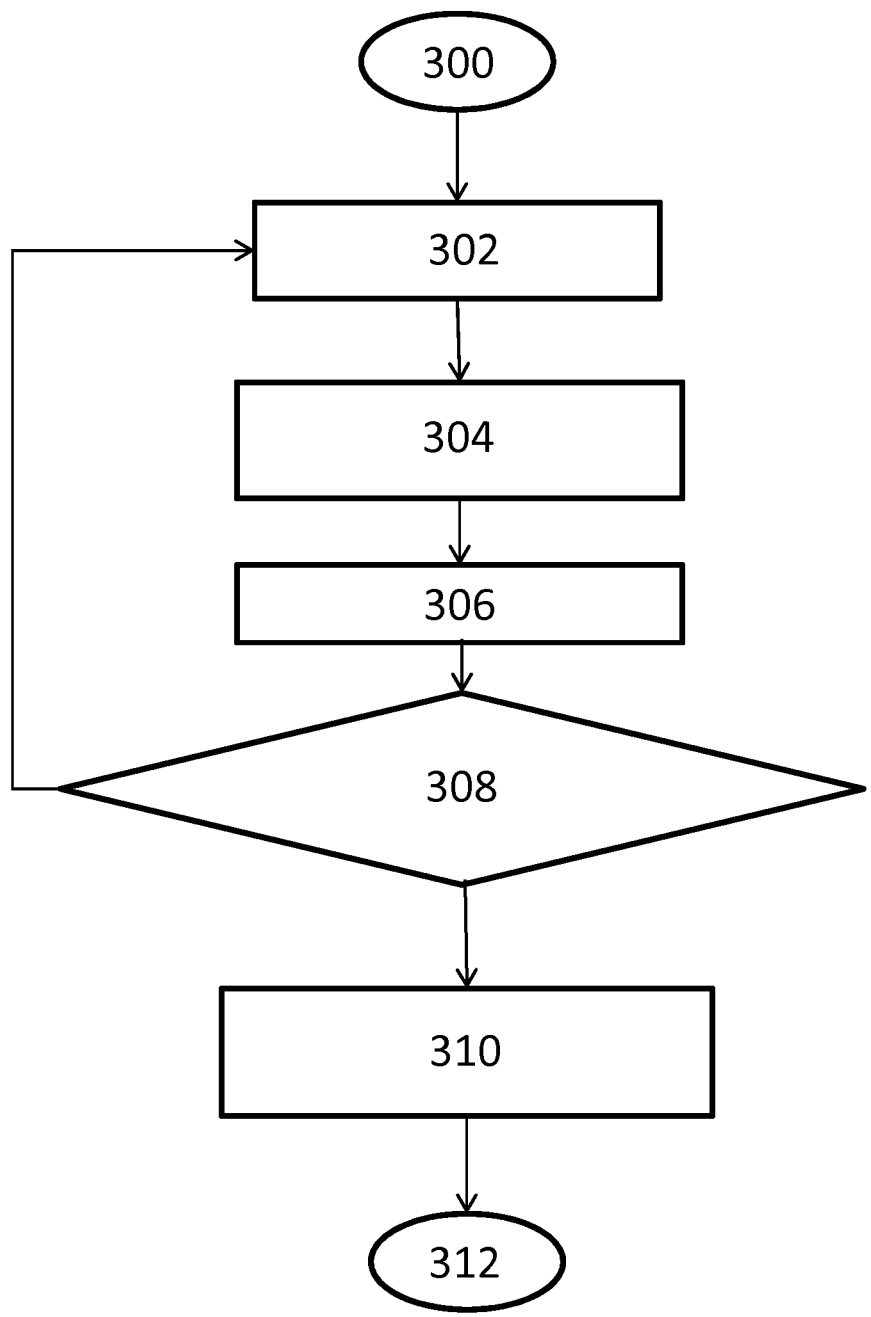

SYSTEM TO MONITOR REGENERATION FREQUENCY OF PARTICULATE FILTER

FIELD OF THE INVENTION

The present disclosure relates to exhaust treatment systems, and more particularly to, a system for monitoring a regeneration frequency of a particulate filter.

BACKGROUND

Vehicle exhaust treatment systems are used to reduce undesired emissions, such as nitrous oxides ($NO_x$) and particulate matter (e.g., soot) output by the vehicle engine. The vehicle exhaust systems typically include a particulate filter ("PF"), which traps the soot from the exhaust gas generated by the engine. The PF may include one or more filter substrates that define a plurality of apertures, through which the exhaust gas must flow. The particulate matter collects on the filter substrate as the exhaust gas flows through the apertures.

A regeneration operation may be performed in response to the occurrence of a regeneration event. The regeneration operation heats the particulate filter to a combustion temperature sufficient to combust (i.e., burns) the collected soot, thereby regenerating the PF. However, performing frequent regeneration operations exposes the PF to excessive heat which accelerates the aging of the filter substrate.

SUMMARY OF THE INVENTION

In one exemplary embodiment of the disclosure, an exhaust treatment system to treat exhaust gas includes a particulate filter configured to trap soot contained in the exhaust gas. A pressure sensor outputs a pressure signal indicative of a pressure differential between an inlet of the particulate filter and an outlet of the particulate filter. A soot mass module is configured to determine a soot mass indicative of an amount of soot stored in the particulate filter based on the pressure differential and a soot model stored in a memory device. An adaptation soot load module is configured to selectively apply a correction factor to the soot mass module. A frequency regeneration module is configured to determine an actual rate at which the correction factor is applied to the soot mass module. The frequency regeneration module further determines.

In another exemplary embodiment of the disclosure, a hardware control module to determine a frequency of regeneration operations for regenerating a particulate filter comprises a memory configured to store a soot model that determines an amount of soot stored in the particulate filter. A soot mass module determines a pressure differential between an inlet and an outlet of the particulate filter, and is configured to determine the soot based on the pressure differential and the soot model. An adaptation soot load module is in electrical communication with the soot mass module. The adaptation soot load module is configured to selectively apply a correction factor to the soot mass module to generate a corrected soot mass. An expected adaptation rate module is in electrical communication with the adaptation soot load module. The expected adaptation rate module is configured to determine an expected rate for applying the correction factor in response to at least one vehicle operating condition output while generating the exhaust gas. A frequency regeneration module is in electrical communication with the adaptation module. The frequency regeneration module is configured to determine an actual rate at which the correction factor is applied to the soot mass module. The frequency regeneration module further determines the particulate filter is excessively regenerated based on a differential between the expected rate and the actual rate.

In yet another exemplary embodiment of the disclosure, a method of determining a frequency of regeneration operations for regenerating a particulate filter comprises determining a pressure differential between an inlet and an outlet of the particulate filter. The method further includes determining a soot mass of the particulate filter based on the pressure differential and a soot mass model. The method further includes selectively applying a correction factor to the soot mass model to generate a corrected soot mass. The method further includes determining an actual rate at which the correction factor is applied to the soot mass model. The method further includes determining the particulate filter is excessively regenerated based on the actual rate and a threshold.

The above features are readily apparent from the following detailed description of the invention when taken in connection with the accompanying drawings.

BRIEF DESCRIPTION OF THE DRAWINGS

Other features appear, by way of example only, in the following detailed description of embodiments, the detailed description referring to the drawings in which:

FIG. 3 is a flow diagram illustrating a method of detecting a regeneration frequency of a particulate filter according to an exemplary embodiment of the disclosure.

DESCRIPTION OF THE EMBODIMENTS

Figure 1:
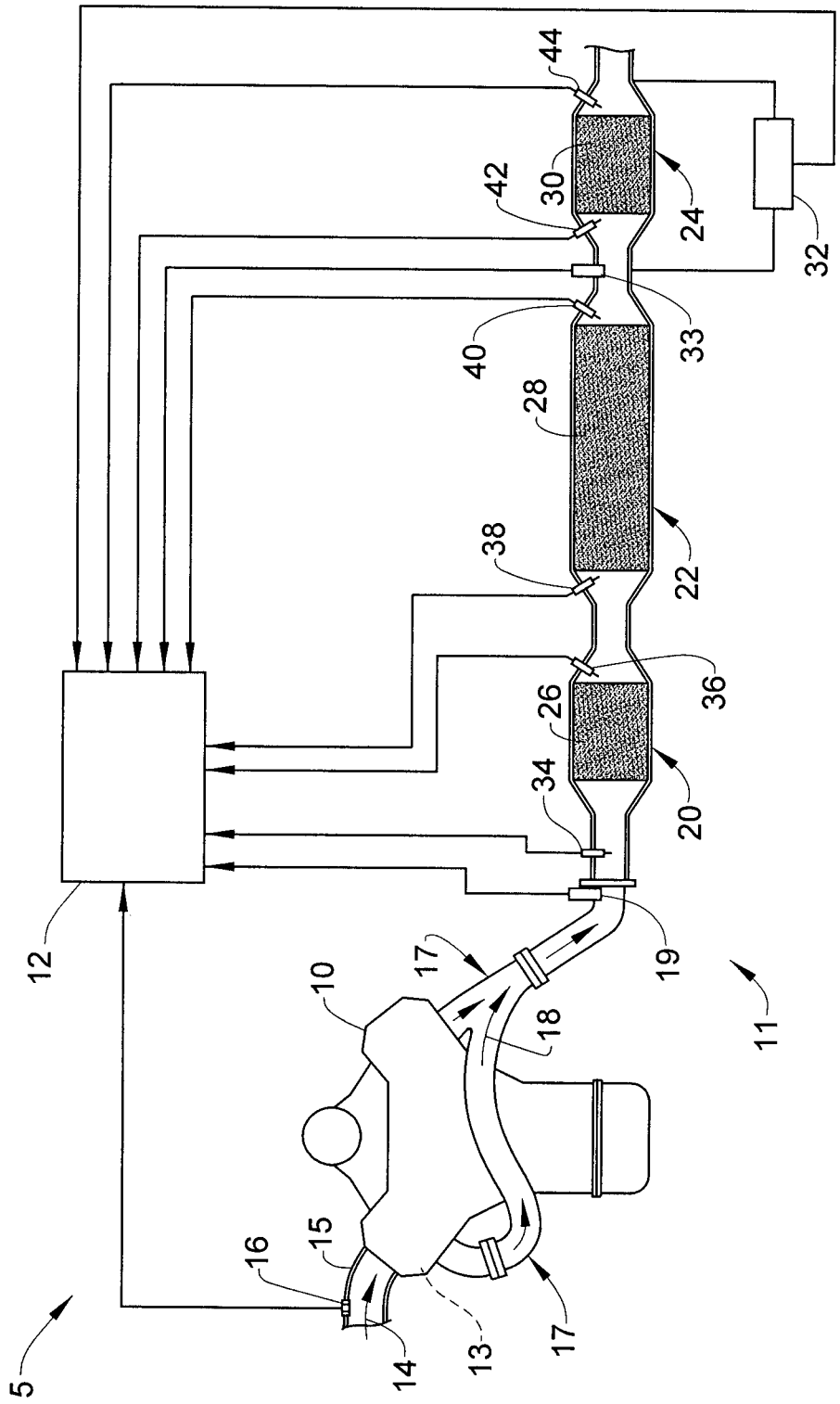
FIG. 1 is a block diagram of an exhaust treatment system including a control module configured to determine a frequency of regenerating a particulate filter according to an exemplary embodiment of the disclosure.

The following description is merely exemplary in nature and is not intended to limit the present disclosure, its application or uses. It should be understood that throughout the drawings, corresponding reference numerals indicate like or corresponding parts and features.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality. In at least one embodiment of the present disclosure, a module may include a microcontroller as understood by those ordinarily skilled in the art.

Referring now to FIG. 1, a vehicle system 5 is generally shown according to an embodiment of the present disclosure. The vehicle system 5 includes an internal combustion (IC) engine 10, an exhaust gas treatment system 11, and a vehicle control module 12. The engine 10 may include, but is not limited to, a diesel engine, gasoline engine, and a homogeneous charge compression ignition engine. The engine 10 includes at least one cylinder 13 that receives fuel, and is configured to receive air 14 via an air intake passage 15. The air intake passage 15 includes a mass air flow (MAF) sensor 16 to determine an intake air mass (mAir) of the engine 10. In one embodiment, the MAF sensor 16 may include either a vane meter or a hot wire type intake mass air flow sensor. However, it is appreciated that other types of sensors may be used as well. An exhaust gas conduit 17 may convey exhaust gas 18 that is generated in response to combusting the fuel and air in the cylinder 13. The exhaust gas conduit 17 may include one or more segments containing one or more aftertreatment devices of the exhaust gas treatment system 11, as discussed in greater detail below. A NOx sensor 19 may be disposed downstream from the engine 10 to determine an amount of NOx present in the exhaust gas 18 and/or a NOx flow rate.

The exhaust gas treatment system 11 described herein can be utilized with any of the engine systems described above to reduce exhaust gas constituents generated during combustion. The exhaust gas treatment system 11 generally includes one or more exhaust treatment devices. The exhaust treatment devices may include, but are not limited to, an oxidation catalyst device ("OC") 20, a selective catalytic reduction device ("SCR") 22, and a particulate filter ("PF") 24. In at least one exemplary embodiment of the disclosure, the PF 24 is a diesel particulate filter. As can be appreciated, the exhaust gas treatment system 11 of the present disclosure may include various combinations of one or more of the exhaust treatment devices 20, 22, 24 shown in FIG. 1, and/or other exhaust treatment devices (not shown) and is not limited to the present example.

Referring to FIG. 1, the exhaust gas conduit 17, which may comprise several segments, transports exhaust gas 18 from the engine 10 to the various exhaust treatment devices 20, 22, 24 of the exhaust gas treatment system 11. As can be appreciated, the OC 20 can be of various flow-through, oxidation catalyst devices known in the art. In various embodiments the OC 20 may include a flow-through metal or ceramic monolith substrate 26 that is wrapped in an intumescent mat or other suitable support that expands when heated, securing and insulating the substrate. The substrate 26 may be packaged in a stainless steel shell or canister having an inlet and an outlet in fluid communication with the exhaust gas conduit 17. The substrate 26 can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 20 is useful in treating unburned gaseous and non-volatile HC and CO, which are oxidized to form carbon dioxide and water.

The SCR device 22 may be disposed downstream of the OC 20, and is configured to reduce NOx constituents in the exhaust gas 18. In a manner similar to the OC 20, the SCR device 22 may include, for example, a flow-through ceramic or metal monolith substrate that may be packaged in a stainless steel shell or canister having an inlet and an outlet in fluid communication with the exhaust gas conduit 17. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 18 in the presence of a reductant (e.g., ammonia) as understood by those ordinarily skilled in the art.

The PF 24 may be disposed downstream from the SCR device 22, and filters the exhaust gas 18 of carbon and other particulate matter (e.g., soot). The PF 24 has an inlet and an outlet in fluid communication with exhaust gas conduit 17. According to at least one exemplary embodiment, the PF 24 may be constructed using a ceramic wall flow monolith exhaust gas filter substrate 30 that is wrapped in an intumescent or non-intumescent material (not shown) that expands, when heated to secure and insulate the filter substrate 30 which is packaged in a rigid, heat resistant shell or canister. It is appreciated that the ceramic wall flow monolith filter substrate 30 is merely exemplary in nature and that the PF 24 may include other filter devices such as wound or packed fiber filters, open cell foams, sintered metal fibers, etc. The filter substrate 30 may include a ceramic filter element (e.g., a wall-flow element) configured to trap particulate matter included in the exhaust gas 18. The exhaust gas treatment system 11 may perform a regeneration operation that regenerates the PF 24 by burning off soot trapped in the filter substrate 30. Various systems as known to those ordinarily skilled in the art may be used for performing the regeneration operation to regenerate the PF 24.

The exhaust gas treatment system 11 may further include at least one pressure sensor 32 (e.g., a delta pressure sensor), as illustrated in FIG. 1. The delta pressure sensor 32 may determine the pressure differential (i.e., $\Delta p$) across the PF 24. Although a single delta pressure sensor 32 is illustrated, it is appreciated that a plurality of pressure sensors may be used to determine the pressure differential of the PF 24. For example, a first pressure sensor may be disposed at the inlet of the PF 24 and a second pressure sensor may be disposed at the outlet of the PF 24. Accordingly, the difference between the pressure detected by the second delta pressure sensor and the pressure detected by the first delta pressure sensor may indicate the $\Delta p$ of the PF 24.

In addition to the delta pressure sensor 32, the exhaust gas treatment system 11 may include an oxygen ($O_2$) sensor 33, and one or more temperature sensors. The $O_2$ sensor 33 is disposed upstream from the PF 24 to determine a concentration of $O_2$ and/or an $O_2$ flow rate at the PF inlet.

With respect to the temperature sensors, at least one exemplary embodiment of the present disclosure provides temperature sensors 34-44, as illustrated in FIG. 1. The number of temperature sensors illustrated in FIG. 1, however, is not limited thereto. First temperature sensor 34 and second temperature sensor 36 are disposed at the inlet and outlet of the OC 20, respectively, and may determine a temperature of the substrate 26. Third temperature sensor 38 and fourth temperature sensor 40 are disposed at the inlet and outlet of the SCR device 22, respectively, and may determine a temperature of the substrate 28. Fifth temperature sensor 42 and sixth temperature sensor 44 are disposed at the inlet and outlet of the PF 24, respectively, and may determine a temperature of the filter substrate 30.

The vehicle control module 12 controls one or more operations of the engine 10 and/or the exhaust gas treatment system 11 based on measurements provided by one or more sensors and/or operating models. According to at least one exemplary embodiment, the vehicle control module 12 may control the regeneration operation, which regenerates the PF 24 when a regeneration event exists. The regeneration event may be determined using one or more soot mass models.

One or more of the soot mass models may be used to determine an amount of soot (i.e., soot mass) stored in the filter substrate 30 based on $\Delta p$ as known by those ordinarily skilled in the art. When a regeneration event exists, the regeneration operation is performed, which heats the PF 24 to a combustion temperature that is sufficient to combust (i.e., burn) the collected particulate matter (e.g., soot). However, various conditions (e.g., low exhaust mass flow rate, fast temperature transients across the PF 24, and aging of the filter substrate 30 caused by frequent regeneration operations) may vary estimations of the soot mass determined by the soot mass model.

To compensate for variations in soot mass estimations, the vehicle control module 12 may selectively enable different soot mass models based on a confidence condition factor. The confidence condition factor is a condition indicating the confidence of the accuracy of a particular soot mass model at a respective engine operating condition (e.g., at a given Δp). In at least one exemplary embodiment, the confidence condition factor may be based on a comparison between the Δp and a pressure threshold ($TH_P$). When Δp is does not satisfy $TH_P$ (e.g., Δp falls outside a $TH_P$ range), a low confidence condition is determined. However, when Δp satisfies $TH_P$ (e.g., Δp falls within the $TH_P$ range), a high confidence condition is determined.

Various soot mass models may prove to be more accurate at different operating conditions. For example, a first soot mass model, such as a kinetics-based soot loading model (hereinafter referred to as a kinetics soot loading model) may be used at low confidence conditions when Δp falls outside $TH_P$. Inputs to the kinetics soot loading model include, but are not limited to, exhaust gas temperature, flow rate, engine speed, fuel flow rate, pressure upstream of the PF 24, hydrocarbon flow rate, O2 concentration and/or flow at the inlet of the PF 24, and NOx concentration and/or flow rate. The soot rate at the inlet to the after-treatment component may be based on, for example, a differential pressure, estimated soot rates corrected by exhaust sensors, various engine parameters, and one or more other appropriate indices.

A second soot mass model, such as a Δp soot mass model, may be used at high confidence conditions when Δp falls within the $TH_P$. Inputs to the Δp soot mass model include, but are not limited to, inlet pressure of the PF 24, Δp of the PF 24, exhaust mass flow rate, and inlet temperature of the PF 24. In at least one embodiment, the Δp soot mass model may be used to adapt (i.e., correct) the kinetics soot loading model as discussed in greater detail below.

The control module 12 may determine the actual soot mass of the PF 24 according to the kinetics soot loading model during a low confidence condition, and may determine the actual soot mass of the PF 24 according to the Δp soot mass model during a high confidence condition. In at least one embodiment, the control module 12 also corrects (i.e., adapts) the kinetics soot loading model according to the Δp soot mass model when the high confidence condition exists. When the engine operates at normal operating conditions (e.g., without a faulty PF 24), it is expected that the adaptation of the kinetics soot loading model is minor or unsubstantial. That is, the soot mass stored in the filter substrate 30 (i.e., the stored soot mass) indicated by the kinetics soot loading model is expected to be close to the stored soot mass indicated by the Δp soot mass model. Therefore, the amount at which the kinetics soot loading model is adapted (i.e., corrected) is minor. However, when the engine operates at modified operating conditions (e.g., a degraded PF 24 exits), the adaptation of the kinetics soot loading model is more prevalent and more substantial. Therefore, an adaptation differential (i.e., an amount at which the kinetics soot loading model is adapted) may be stored in the control module 12 to determine that a modified operating condition, such as a degraded PF 24, for example, exists.

In at least one embodiment, a mass differential ($\Delta_{MASS}$) between the kinetics soot loading model and the Δp soot mass model may be used to determine if a degraded PF 24 and/or an excessively regenerated PF 24 exists. The $\Delta_{MASS}$ is a difference between the stored soot mass determined by the kinetics soot loading model and the stored mass determined by the Δp soot mass model. If $\Delta_{MASS}$ falls within a threshold, a normal engine operating condition may be determined. However, if $\Delta_{MASS}$ exceeds the threshold, a fault, including but not limited to a degraded PF 24 and excessively regenerated PF 24, may be determined.

The adaptation of the kinetics soot loading model occurs more frequently during undesired operating conditions (e.g., when a degraded PF 24 exists) which may require excessive regeneration of the PF 24, than during normal operating conditions. Accordingly, at least one embodiment determines a faulty engine operating condition based on an actual adaptation model use-rate (hereinafter referred to as actual adaptation rate). The actual adaptation rate indicates the rate at which the kinetics soot loading model is adapted (i.e., corrected).

The vehicle control module 12 may also determine an expected adaptation use-rate (hereinafter referred to as expected adaptation rate). The expected adaptation rate is based on various operating conditions including, but not limited to, engine speed, engine fuel intake, and exhaust conditions (e.g., $NO_x$ levels of the exhaust gas 18). The operating conditions may be determined by one or more sensors as known to those ordinarily skilled in the art. The vehicle control module 12 may compare the actual adaptation rate to the expected adaptation rate. If the actual adaptation rate exceeds the expected adaptation rate, or exceeds the expected adaptation rate by a threshold value, the vehicle control module 12 may output a fault frequency signal. The fault frequency signal may indicate an excessive fault event such as, for example, excessive regeneration of the PF 24 exists. In at least one exemplary embodiment, the fault frequency signal may over-ride (i.e., halt) an upcoming scheduled regeneration operation in response to detecting the fault frequency signal to prevent further aging and/or degrading of the filter substrate 30 caused by excessive regenerations.

Figure 2:
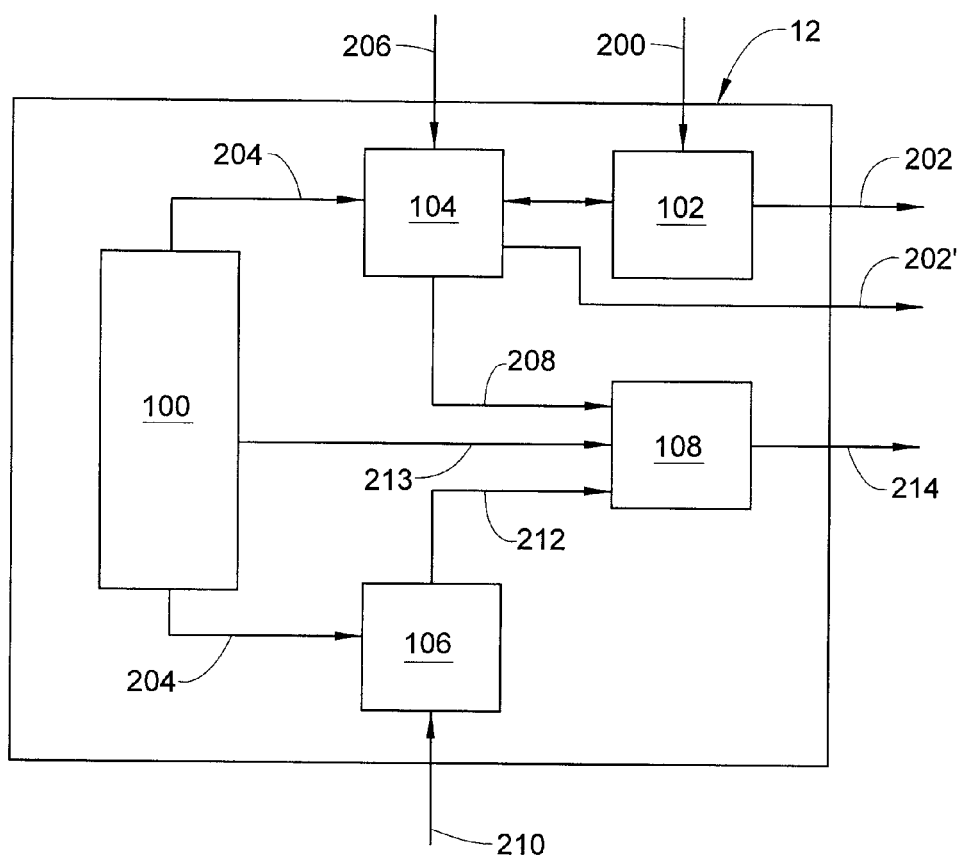
FIG. 2 is a block diagram illustrating a vehicle control module that determines a frequency of regenerating a particulate filter according to an exemplary embodiment of the present disclosure.

Turning now to FIG. 2, a block diagram illustrates a vehicle control module 12 that determines a frequency of regenerating a PF 24 according to an embodiment of the present disclosure. Various exemplary embodiments of the vehicle system 5 may include any number of sub-modules embedded within the vehicle control module 12. As can be appreciated, the sub-modules shown in FIG. 2 may be combined or further partitioned as well. Inputs to the vehicle control module 12 may be sensed from the exhaust gas treatment system 11, received from other control modules, for example an engine control module (not shown), or determined by other sub-modules.

As illustrated in FIG. 2, the vehicle control module 12 according to at least one embodiment includes a memory 100, a soot mass module 102, an adaptation soot load module 104, an expected adaptation rate module 106, and a regeneration frequency module 108. Each of the modules 102-108 interfaces and electrically communicates with the memory 100 to retrieve and update stored values, thresholds, models, etc., as needed.

The memory 100 may store one or more threshold values, time periods over which the temperatures were measured a number of configurable limits, maps, data values, variables, and system models used to perform the regeneration operation. In at least one embodiment of the present disclosure, the memory 100 stores various parameters including, but not limited to, exhaust gas volume flow rate (i.e., dvol), specific heat constants, dimensions of the PF 24, filter efficiency of the PF 24 and a PF confidence condition factor used to select a soot model that may be used to determine soot mass of the PF 24. As described above, the confidence condition factor may be based on a comparison between the Δp and a pressure threshold ($TH_P$).

The soot mass module 102 stores the soot mass model used to determine the soot mass of the PF 24. More specifically, the soot mass module 102 may be in electrical communication with the delta pressure sensor 32 to receive a Δp signal 200 indicating $\Delta p$. If the confidence condition factor is satisfied, (e.g., within the threshold), then the soot mass module 102 determines the actual soot loading based on the $\Delta p$ soot mass model and $\Delta p$ determined by the $\Delta p$ sensor 32. The output of the soot mass module 102 is enabled such that a soot mass signal 202 indicating a soot mass of the PF 24 is generated. The soot mass module 102 may also communicate the actual soot mass determined using the $\Delta p$ soot mass model to the adaptation soot load module 104. When the confidence condition factor is not satisfied, however, output of soot mass module 102 is disabled and the actual soot loading is provided by an output of the adaptation soot loading module 104 using the kinetics soot loading model as discussed in greater detail below.

The adaptation soot load module 104 stores the kinetics soot loading model. As discussed above, if the confidence condition factor is satisfied, the actual soot load is determined by the soot mass module 102 using the $\Delta p$ soot mass model. In the meanwhile, the adaptation soot load module 104 may adapt the kinetics soot loading model according to the $\Delta p$ soot mass model. However, if the confidence condition factor is not satisfied, (e.g., outside the threshold), the soot mass module 102 is disabled and the kinetics soot loading model may determine the actual soot load based on one or more vehicle parameter signals 204 and one or more soot parameter signals 206. Accordingly, the adaptation soot load module 104 may output an actual soot load signal 202' indicating the actual soot load of the PF 24. The vehicle parameter signals 204 indicate various vehicle parameters stored in the memory 100 including, but not limited to, specific heat of the PF 24, dimensions of the PF 24 and the confidence condition factor. The soot parameter signals 206 indicate various soot parameters including, but not limited to, engine out soot rate (i.e., $SOOT_{OUT}$), filter efficiency ($PF_{EFF}$) of the PF 24, and a soot burning rate ($SOOT_{BURN}$). The $SOOT_{BURN}$ may be based on an $O_2$ measurement provided by the $O_2$ sensor 33 and a $NO_x$ measurement provided by the $NO_x$ sensor 19. In at least one embodiment, the updated kinetics soot loading model (i.e., the adapted kinetics soot model) may be stored in the memory 100.

The adaptation soot load module 104 may also determine the actual rate at which the kinetics soot loading model is adapted. For example, the adaptation soot load module 104 may use an actual adaptation use-rate model to determine a number of instances the kinetics soot loading model is enabled over a period of time. Enablement of the kinetics soot loading model may be determined in response to detecting the actual soot load signal 202' output by the adaptation soot load module 104. An $ADAPT_{ACTUAL}$ signal 208 may be output from the adaptation soot load module 104 indicating the actual adaptation rate. In at least one embodiment, the actual adaptation signal 208 may be filtered (e.g., using a low-pass filter) to obtain a more accurate actual adaptation rate. The actual adaptation rate may be used to determine a frequency at which the PF 24 is regenerated as discussed in greater detail below.

The expected adaptation rate module 106 may determine an expected adaptation rate ($ADAPT_{EXPECT}$) based on the vehicle parameter signals 204 and/or one or more vehicle operating signals 210. The vehicle operating signals 210 may indicate a respective vehicle operating condition of the vehicle system 5. The vehicle operating conditions may include, but are not limited to, engine speed, fuel intake, and $NO_x$ levels of the exhaust gas 18. An $ADAPT_{EXPECT}$ signal 212 may be output from the expected adaptation rate module 106 to indicate the expected adaptation rate.

The regeneration frequency module 108 is in electrical communication with the adaptation soot load module 104 and the expected adaptation rate module 106 to determine a fault event. For example, the regeneration frequency module 108 may determine the frequency at which the PF 24 is regenerated and determine whether a fault event, such as excessive regeneration of the PF 24, exists.

According to at least one exemplary embodiment of the disclosure, the regeneration frequency module 108 may compare the actual adaptation rate ($ADAPT_{ACTUAL}$) to the expected adaptation rate ($ADAPT_{EXPECT}$) to determine a rate differential ($\Delta_{RATE}$). The $\Delta_{RATE}$ may then be compared to a threshold $TH_{RATE}$ 213. The $TH_{RATE}$ 213 may be stored in memory 100 or may be stored in a separate memory of the regeneration frequency module 108. If $\Delta_{RATE}$ exceeds $TH_{RATE}$ 213, then the regeneration frequency module 108 outputs a frequency fault signal 214 indicating a fault condition exists.

In another embodiment, the expected adaptation rate $ADAPT_{EXPECT}$ may act as the threshold. That is, $ADAPT_{ACTUAL}$ may be compared directly to $ADAPT_{EXPECT}$. If $ADAPT_{ACTUAL}$ exceeds $ADAPT_{EXPECT}$, then the regeneration frequency module 108 may determine a fault condition exists. The fault condition may include an excessive condition event such as, for example, an excessive regeneration of the PF 24. An excessive regeneration may indicate, for example, that the PF 24 has been regenerated beyond regulation required limits.

Turning now to FIG. 3, a flow diagram illustrates a method of detecting regeneration frequency of a PF according to an exemplary embodiment. The method begins at operation 300, and proceeds to operation 302 to determine a mass differential ($\Delta_{MASS}$) between the stored soot mass determined by a first soot model (e.g., a kinetics soot loading model) and the stored mass determined by a second soot model (e.g., the $\Delta p$ soot mass model) exists. The $\Delta_{MASS}$ may be determined during a high confidence condition such that actual soot load is determined according to the $\Delta p$ soot mass model, and the kinetics soot loading model is adapted according to the $\Delta p$ soot mass model. At operation 304, the kinetics soot loading model is adapted according to the $\Delta p$ soot mass model. At operation 306, an actual adaptation rate ($RATE_{ACTUAL}$) is determined. The actual adaptation rate may indicate the rate at which the kinetics soot loading model is adapted, for example.

At operation 308, $RATE_{ACTUAL}$ is compared to an expected adaptation rate ($RATE_{EXPECT}$). If $RATE_{ACTUAL}$ does not exceed $RATE_{EXPECT}$, then the method returns to operation 302 and continues determining $\Delta_{MASS}$. If $RATE_{ACTUAL}$ exceeds $RATE_{EXPECT}$, then a fault is determined at operation 310 and the method ends at operation 312. In another embodiment, the difference ($\Delta_{RATE}$) between $RATE_{ACTUAL}$ and $RATE_{ACTUAL}$ may be compared to a threshold ($TH_{RATE}$). If $\Delta_{RATE}$ exceeds $TH_{RATE}$, then a fault may be determined and the method ends. The fault may include and excessive condition event such as, for example, an excessive regeneration event.

While various features of the present exemplary embodiments of the present disclosure have been described, it will be understood by those skilled in the art that various changes may be made and equivalents may be substituted for elements thereof without departing from the scope of the invention. In addition, many modifications may be made to adapt a particular situation or material to the exemplary embodiments without departing from the essential scope of the inventive teachings described herein. Therefore, it is intended that the invention not be limited to the particular embodiments disclosed, but that the invention will include all embodiments falling within the scope of the application.

What is claimed is:

1. An exhaust treatment system to treat exhaust gas, the exhaust treatment system comprising:
   a particulate filter configured to trap soot contained in the exhaust gas flowing therethrough;
   a pressure sensor that outputs a pressure signal indicative of a pressure differential between an inlet of the particulate filter and an outlet of the particulate filter;
   a soot mass module in electrical communication with the pressure sensor, the soot mass module configured to determine a soot mass indicative of an amount of soot stored in the particulate filter based on the pressure differential, the soot mass selectively determined according to one of a first soot model and a second soot model different from the first soot model;
   an adaptation soot load module in electrical communication with the soot mass module, the adaptation soot load module configured to correct the first soot model based on the second soot model such that the first soot model is adapted to the second soot model;
   an expected adaptation rate module in electrical communication with the adaptation soot load module, the expected adaptation rate module including an electronic microcontroller having computer readable instructions that when executed by microcontroller is configured to determine an expected rate for applying the correction factor, the expected rate based on at least one vehicle operating condition output while generating the exhaust gas;
   a frequency regeneration module in electrical communication with the adaptation module, the frequency regeneration module configured to determine an actual rate at which the first soot model is corrected, and to determine a fault based on the actual rate and a threshold, the fault including the particulate filter is excessively regenerated based on a comparison between a threshold a differential value of the expected rate and the actual rate;
   a filter regeneration system that regenerates the particulate filter according to a regeneration operation,
   wherein the fault regeneration module over-rides an upcoming scheduled regeneration operation in response to the differential value exceeding the threshold.

2. The exhaust gas treatment system of claim 1, wherein the frequency regeneration module determines a differential between the expected rate and the actual rate.

3. The exhaust gas treatment system of claim 2, wherein the frequency regeneration module determines the particulate filter is excessively regenerated in response to the differential exceeding the threshold.

4. The exhaust gas treatment system of claim 3, wherein the expected rate is based on at least one of a speed of an engine generating the exhaust gas, a fuel intake of the engine and a level of $NO_x$ in the exhaust gas.

5. The exhaust gas treatment system of claim 4, wherein the correction factor is based on at least one of soot flow rate of the exhaust gas, a filtering efficiency of the particulate filter, and a burning rate of soot stored in the particulate filter.

6. The exhaust gas treatment system of claim 5, wherein the burn rate is based on a level of oxygen in the exhaust gas and a level of $NO_x$ in the exhaust gas.

7. A hardware control module to determine a frequency of regeneration operations for regenerating a particulate filter, the control module comprising:
   a memory configured to store a plurality of soot models that determines a soot mass stored in the particulate filter;
   a soot mass module that determines a pressure differential between an inlet and an outlet of the particulate filter, and that is configured to determine the soot mass based on the pressure differential and the soot model;
   an adaptation soot load module in electrical communication with the soot mass module, the adaptation soot load module configured to correct a first soot model according to a second soot model different from the first soot model;
   an expected adaptation rate module in electrical communication with the adaptation soot load module, the expected adaptation rate module including an electronic microcontroller having memory that stores non-transient computer readable instruction that when executed by the microcontroller is configured to determine an expected rate for applying the correction factor, the expected rate based on at least one vehicle operating condition output while generating the exhaust gas;
   a frequency regeneration module in electrical communication with the adaptation module, the frequency regeneration module configured to determine an actual rate at which the first soot model is corrected, and to determine an excessive regeneration of the particulate filter based on a comparison between a threshold and a differential value of the actual rate and the expected rate;
   wherein the fault regeneration module controls a regeneration system that regenerates the particular filter to over-ride an upcoming regeneration operation in response to the differential value exceeding the threshold.

8. The hardware control module of claim 7, wherein the expected rate threshold indicates the expected rate, and wherein the frequency regeneration module determines the particulate filter is excessively regenerated in response to the actual rate exceeding the expected rate threshold.

9. The hardware control module of claim 8, wherein the expected rate is based on at least one of a speed of an engine generating the exhaust gas, a fuel intake of the engine and a level of $NO_x$ in the exhaust gas.

10. The hardware control module of claim 9, wherein the correction factor is based on at least one of a soot flow rate of the exhaust gas, a filtering efficiency of the particulate filter, and a burning rate of soot stored in the particulate filter.

11. A method of determining a frequency of regeneration operations for regenerating a particulate filter, the method comprising:
   determining a pressure differential between an inlet and an outlet of the particulate filter;
   determining a soot mass of the particulate filter based on the pressure differential and a first soot mass model selected from a plurality of soot mass models, the first soot mass indicating an amount of soot stored in the particulate filter;
   determining a correction factor based on the first soot mass model, and applying the correction factor to a second soot mass model different from the first soot model such that the second soot model adapts to the first soot mass model;
   determine an expected rate for applying the correction factor, the expected rate based on at least one vehicle operating condition output while generating the exhaust gas;
   determining an actual rate at which the correction factor is applied to the second soot mass model;
   determining the particulate filter is excessively regenerated based on a comparison between a threshold and a differential value of the actual rate and the expected rate; and controlling a system to halt an upcoming regeneration operation that regenerates the particulate filter in response to determining the differential value exceeds the threshold.

12. The method of claim 11, wherein the threshold indicates the expected rate for applying the correction factor that occurs when the particulate filter is free from degradation.

13. The method of claim 12, further comprising determining the particulate filter is excessively regenerated in response to the actual adaptation rate exceeding the threshold.

14. The method of claim 13, further comprising: determining the expected rate based on at least one of a speed of an engine generating the exhaust gas, a fuel intake of the engine and a level of $NO_x$ in the exhaust gas.

15. The method of claim 14, further comprising determining the correction factor based on at least one of a soot flow rate of the exhaust gas, a filtering efficiency of the particulate filter, and a burning rate of soot stored in the particulate filter.

* * * * *